United States Patent [19]

Gyurovits

[11] Patent Number: 4,582,084
[45] Date of Patent: Apr. 15, 1986

[54] POSITIVE FLOW CONTROL VALVE

[76] Inventor: John S. Gyurovits, 20 Jay Rd., Chatham Township, Morris County, N.J. 07928

[21] Appl. No.: 716,546

[22] Filed: Mar. 27, 1985

[51] Int. Cl.[4] ............................................. F16K 17/18
[52] U.S. Cl. .................................. 137/493.8; 137/599; 251/206
[58] Field of Search .............................. 251/206, 207; 137/493.7, 493.8, 599

[56] References Cited

U.S. PATENT DOCUMENTS

| | | | |
|---|---|---|---|
| 4,148,460 | 4/1979 | Kinsler | 251/206 |
| 4,195,552 | 4/1980 | Neff | 137/493.8 X |
| 4,366,947 | 1/1983 | Voege | 251/206 |

Primary Examiner—Robert G. Nilson

[57] ABSTRACT

The positive flow control valve of this invention comprise an interchangeable rotary plug valve member having different outside diameters and a plurality of restrictive orifices leading into a common manifold thereon connecting the inlet bore to the outlet port. Said plug include means to adjustably select orifice function and to produce the desired cross-sectional change in the flow path individually for each said orifice. By rotating said plug to have a selected orifice coaxially aligned to the inlet bore a previously adjusted flow rate through the valve is re-established and maintained in position by a mechanical detent. A seal located at the inlet bore of the housing and the orifice of said plug providing leak proof connection therebetween. The outlet port of the housing having a check valve therein and said port is bypassably connected to the inlet port extention bore wherein another check valve maintains the desired direction of the return flow therethrough into the inlet port. An internally connected adjustable safety valve provides the means for setting maximum allowable internal pressure therein and to relieve the excess pressure therefrom through a relief port.

15 Claims, 22 Drawing Figures

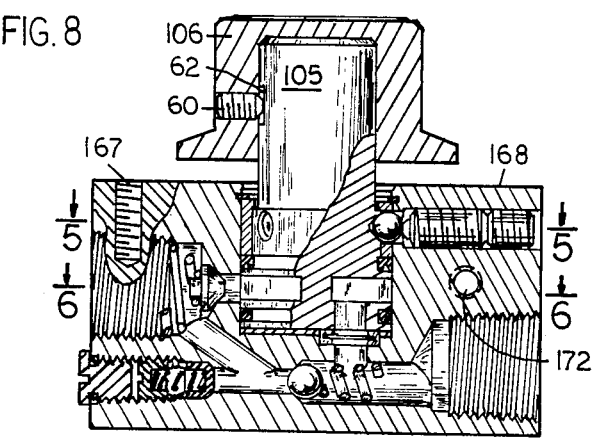
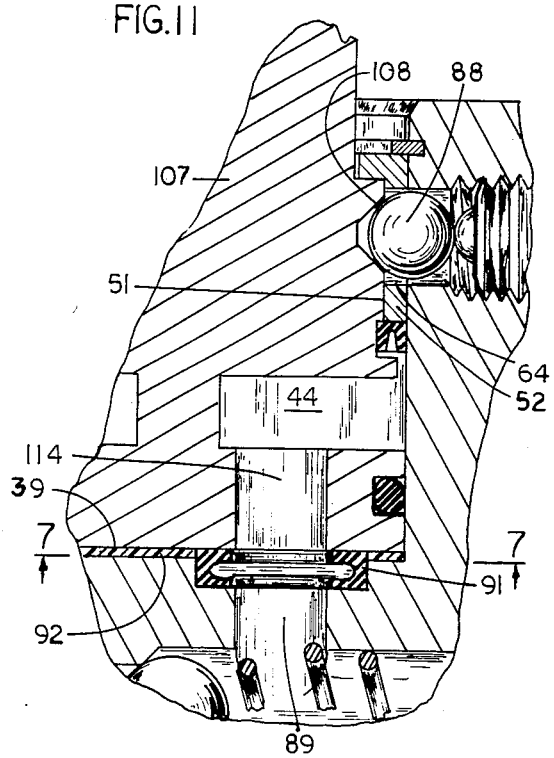
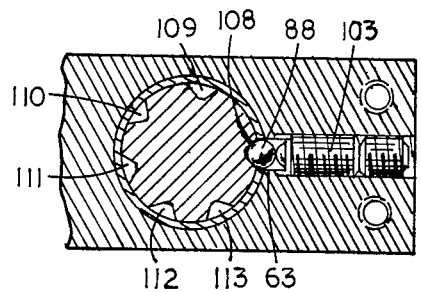
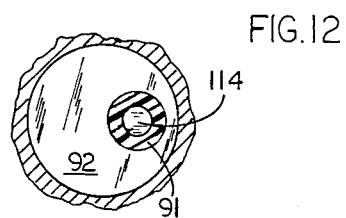
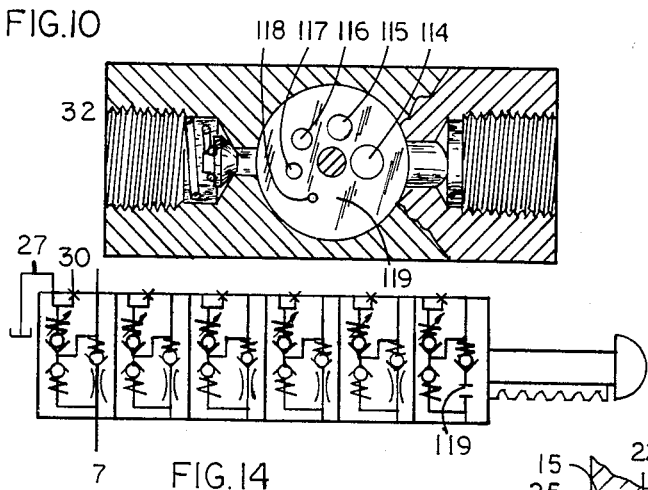
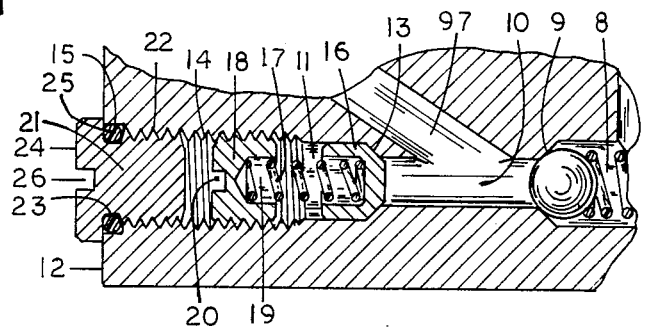

POSITIVE FLOW CONTROL VALVE

CROSS-REFERENCES TO RELATED APPLICATIONS

Field of search: 91/443, 127, 130, 134, 137/242, 138/45, 180, 193/32, 280, 251/86, 251/304, 314, 318, 358, 556.6, 604.

| References Cited: United States Patents | | | |
|---|---|---|---|
| 562,410 | 6/1896 | Moon, | |
| 934,932 | 9/1909 | Osbourn, | |
| 1,017,292 | 2/1912 | Hyde, | |
| 1,621,876 | 3/1927 | Doerr, | |
| 1,982,754 | 12/1934 | Peterson | 251/86, |
| 2,510,356 | 6/1950 | Werts | 251/86, |
| 2,685,891 | 8/1954 | Segelhorst | 137/614.16, |
| 2,897,936 | 8/1959 | Collins | 193/32, |
| 3,024,806 | 3/1962 | Colonna | 137/604, |
| 3,136,341 | 6/1964 | Walker | 138/45, |
| 3,812,882 | 5/1974 | Taylor | 137/556.6, |
| 3,949,967 | 4/1976 | Kraftel | 251/314, |
| 4,148,460 | 4/1979 | Kinsler | 251/206, |
| 4,195,552 | 4/1980 | Neff | 91/443, |
| 4,366,947 | 1/1983 | Voege | 251/206, |

BACKGROUND OF THE INVENTION

1. Field of the Invention

This invention relatets to manually operated orifice type flow control valves generally used for controlling the rate of flow of liquid or gases in systems where input pressure is held constant, especially to the class of valves, where an interchangeable plug valve member that is rotatably switched from one position to another within the same flow path at corresponding surfaces, and having a plurality of round orifices therein, and is provided with mechanical means to precisely tune said flow rate through each orifice individually, to a desired setting value and to retain said adjustments for later use. The plug valve member is disposed in a cylindrical flat bottom bore of a ported valve body, having a positively sealed controlled flow passageway through the plug valve member to the outlet port, a passageway for uncontrolled return flow from the outlet port to the inlet port, and another passageway for safely relieving excess internal pressure through a relief port from therein.

Furthermore, in this invention interchangeable plug valve members having different internal configuration is employed to alter the functional character of the controlled flow passageway without impeding the intended functioning of the excess internal-pressure relief valve therein.

2. Description of the Prior Art

This invention relates to manually operated flow control valves and is particularly suited for, but not limited for applications to control the flow rate of liquids or gases, in laboratory apparatus and in chemical processing equipment as well as in machine tool operation and the like, that is utilized for specialized industrial applications in manufacturing of pharmaceutical as well as other chemical products, where conditions require that precisely adjusted flow rate is reliably maintained, quickly changed to, and to maintain another equally precise flow rate, completely block the controlled flow passageway, or to be switched back to the original setting without the need for re-calibrati on of previously established flow rate, while providing the means for relieving excess internal pressure from therein.

Heretofore, orifice type flow control valves of the prior art in which rotatable plug or disk valve member having a plurality of restrictive orifices therein, and one is being coaxially aligned in metal-to-metal contact with another opening as in U.S. Pat. No. 562,410 O. P. Moon, U.S. Pat. No. 1,017,292 J. Hyde, U.S. Pat. No. 1,621,876 L. H. Doerr, U.S. Pat. No. 2,897,936 R. R. Collins, U.S. Pat. No. 3,136,341 W. E. Walker, Sr., are shown without self-adjusting means to compensate for wear, while U.S. Pat. No. 934,932 M. P. Osbourn, U.S. Pat. No. 2,510,356 R. A. Werts, U.S. Pat. No. 2,685,891 A. L. Segelhorst, and U.S. Pat. No. 3,024,806 J. J. Colonna, are depending on compression spring for maintaining metal-to-metal contact for sealing action, and yet another U.S. Pat. No. 1,982,754 B. L. Peterson, provides for lubrication to minimize component wear, but problems of internal leakage have beset valves of this type to various degrees, where the restrictive orifice is not positively sealed therefore, precisely adjusted flow rate cannot be maintained reliably. In known devices of this kind, adjustment to a given size orifice opening cannot be made to attain a desired setting value, and for this reason there have been problems such as the difficulty of accomplishing highly accurate and positively controlled rate through the valve.

SUMMARY OF THE INVENTION

It is an object of this invention to provide a multi flow path, orifice type positive flow control device that is: manually operated, simple in construction yet highly reliable, compact in size, versatile in uses and in mounting, and is precisely adjustable to attain highly accurate setting value that is storable for further uses as desired, while providing the means for relieving excess internal pressure to be recycled or collected as desired.

The features incorporated herein make this novel valve device especially useful in controlling flow rate of liquids as well as gases in laboratory apparatus, chemical process equipment, machine tools, and the like because this valve overcomes the disadvantages of the prior art, and provides for attainment of precisely controlled process with less complex means, thus enhance economic benefits for the user.

One of the objects of this invention is to provide a valve device in which the controlled flow path is sealably separated from the inlet port connecting passageways to eliminate the problems that are generally associated with internal cross-leakage, thus provide the means to attain positive control of the flow rate therethrough.

Another object of this invention is to provide a valve device in which the rotatable plug type valve member having at least one closed position between a plurality of different size orifices therein, connected to a common manifold and is interchangeable with other similar valve members having equal size orifices therein and means to individually adjust the opening of each orifice to a desired setting value. By this provision of the invention, cross-sectional opening changes of each orifice can be carried out with great accuracy.

Another object of this invention is to provide a valve device in which the rotatable plug valve member having interchangeable opening adjusting means for each orifice that is a functioning part of the independent check valve seating against the inner end of each respective orifice bore. This provision within the plug valve member facilitates a change in the character of the controlled flow path to one in which in addition to orifice adjusting capability, each check valve becomes an intermediate pressure relief means through the controlled flow path for each respective orifice.

Still another object of this invention is to provide an orifice type flow control valve device having a passageway within the valve body for uncontrolled return flow from the outlet port to the inlet port, that is in communication with an external relief port through an adjustable internal-pressure relief means. This feature makes this flow control valve device particularly useful in machine tool application as a critical component of the motion control system.

And still another object of this invention is to provide an orifice type positive flow control valve device having interchangeable plug type valve member, in which orifice setting values attained and such data is mechanically stored within the plug valve member, that is together with associated components provide a data-bank wherefrom such stored information to be recalled as desired, to reestablish any flow rate through the valve device previously attained therethrough.

Still another object of this invention is to provide an orifice type positive flow control device in which the data-bank storing a previously attained orifice settings, it not readily accessible for entry of new setting value without first making a determined effort to achieve such result. By this provision of the invention a limited assurance yielded to maintain stored orifice settings from being changed by persons who are not familiar with the required procedure of entering new information therein.

Yet another object of the invention is to provide an orifice type positive flow control valve device having a means for adjusting the maximum operating pressure limit within the valve body in communication with the relief port. This feature of the invention provides the means to safely relieve excess internal pressure from therein, to be recycled or to be kept separated from the operating system. This feature makes this positive flow control valve device particularly useful in chemical processing equipment and laboratory apparatus, where internal pressure can quickly reach critical levels and rupture could occur.

Other objects, advantages and further features of the invention will be apparent from the following detailed description and the appended claims with respect to several detailed drawings of the preferred embodiment of the invention, and the novel features will be pointed out when read in conjunction with the accompanying drawings.

BRIEF DESCRIPTION OF THE DRAWINGS

Illustrating the preferred embodiment of the invention in accordance with the best mode presently contemplated for carrying out said invention of which herewith reference to the accompanying drawings forming a part thereof and wherein:

FIG. 8 on sheet 2 of 3, is a vertical cross-sectional view taken along line 1—1 of FIG. 1 of sheet 1 of 3, is similar to FIG. 2 of sheet 1, and is fragmented to illustrate the difference between embodiments of the orifice opening adjusting means and to show panel mounting means.

FIG. 9 is a fragmentary, horizontal cross-sectional view taken along line 5—5 of FIG. 8.

FIG. 10 is a horizontal cross-sectional view taken along line 6—6 of FIG. 8, and is fragmented to illustrate inlet port and part of the inlet port chamber in relation to active orifice.

FIG. 11 is a vertical cross-sectional view taken from the fragmented portion of FIG. 8 and is enlarged to clearly illustrate the difference in construction between the orifice opening adjusting means of FIG. 2 of sheet 1, and same in FIG. 8 of sheet 2.

FIG. 12 is a fragmentary, horizontal cross-sectional view taken along line 7—7 of FIG. 11 viewed in the direction of the arrows to show the relationship between orifice and seal.

FIG. 13 is a fragmentary, vertical cross-sectional view taken along line 1—1 of FIG. 1 enlarged to more clearly illustrate the construction of the adjustable internal-pressure relief means.

FIG. 14 is a diagrammatic view, similar to FIG. 7 illustrates the flow path through the valve device in a configuration as said valve component is being illustrated in FIG. 8.

DETAILED DESCRIPTION OF THE PREFERRED EMBODIMENT

Figure 1:
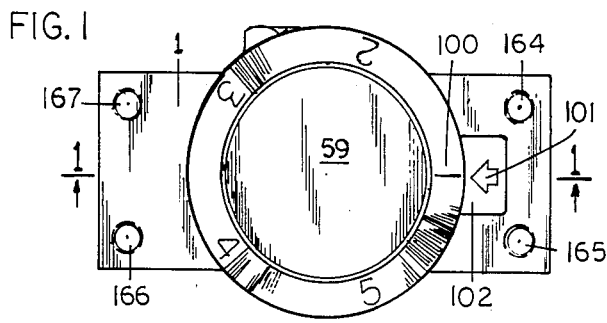
FIG. 1 is a top plan view of the positive flow control valve of the present invention

While the operating principle and the various features of this invention are hereinafter described and illustrated as being particularly adapted to provide a positive flow control valve device for application in chemical processing equipment, laboratory apparatus, machine tool operations, and the like, it is to be understood that the various features of this invention can be utilized singularly or in combination thereof, in embodiments other than those described herein to provide means for positively controlling flow rate with great accuracy.

Therefore, this invention is not to be limited to only the embodiments illustrated in the drawings, because the drawings are merely utilized to illustrate some of the wide variety of uses and not the definition of the limits of the invention. Other uses of the operating principle disclosed herein will become apparent to those skilled in the arts, and therefore, annexation of any extension thereof or alteration of features or components to perform the function described herein, are to be considered a part of this invention and to be restored thereto.

In the drawings wherein similar characters denote similar elements throughout the several views.

Figure 2:
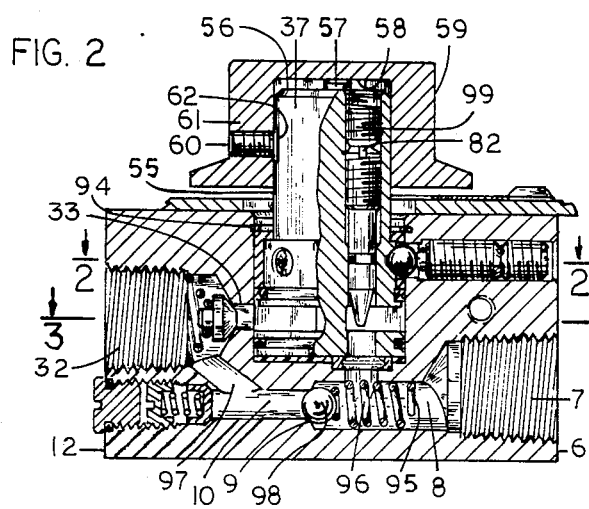
FIG. 2 is a vertical cross-sectional view taken along the 1—1 of FIG. 1, and partially fragmented to illustrate the orifice cross-section adjusting means.
Figure 15:
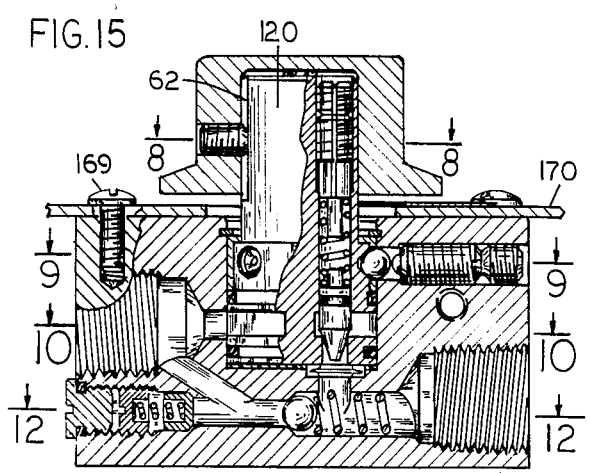
FIG. 15 is a vertical cross-sectional view taken along line 1—1 of FIG. 1 on sheet 1, similar to FIG. 2, of sheet 1, and FIG. 8, of sheet 2, is fragmented to illustrate the embodiments of the different type of orifice opening adjusting and check valve means of the invention.

Referring to the drawings, FIG. 1 the present invention in which the positive flow control valve body 1 generally being made of but not limited to rectangular bar stock that is cut to sufficient length to provide space for passageways and components disposed therein. As illustrated in FIG. 2, 8 and 15 which are vertical cross-sectional views taken at line 1—1 of FIG. 1 having been centrally located on the vertical axis extending inward is the plug bore 2 with chamfer 3 and retainer ring groove 4 at the top, and a planar surface 5 for the bottom. On the vertical center line into end surface 6 of the inlet port 7 is drilled and threaded for connection, from which horizontally inward the inlet port extension bore 8 is made, and about at the halfway point in the valve body 1 below plug bore 2 coaxially conjunct to form seat 9 with smaller diameter bore 10. Straight bore 11 located at the lower half of the vertical center line of end surface 12 and is coaxially aligned to inet port extension bore 8 is extending inwardly and conjuncting smaller diameter bore 10 and forms seat 13. Said bore 11 having internal thread 14 and counter bore 15 therein to house the mechanically adjustable excess internal-pressure relief means, comprised of: socket valve 16, spring 17, self-locking screw 18 having a blind bore 19 to receive spring 17, and a slot 20 centrally located at the outer end, and an end plug 21 having external thread 22 terminating in a flat undercut 23 that together with head 24 forms a housing for seal 25 and head 24 having a slot 26 thereon to receive turning means, FIGS. 2 and 13.

Figure 4:
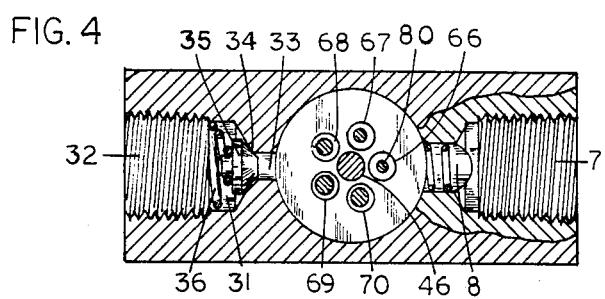
FIG. 4 is a horizontal cross-sectional view taken along line 3—3 of FIG. 2 and partially fragmented to illustrate inlet port and part of inlet port chamber.
Figure 3:
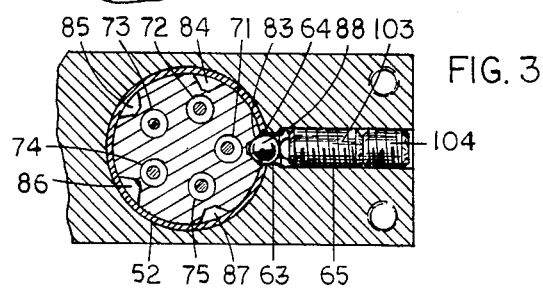
FIG. 3 is a fragmentary, horizontal cross-sectional view taken along line 2—2 of FIG. 2.
Figure 21:
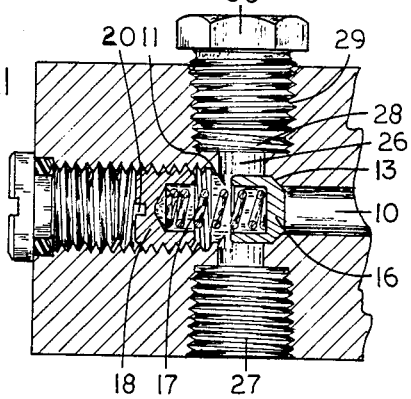
FIG. 21 is a fragmentary, horizontal cross-sectional view taken along line 12—12 of FIG. 15, of sheet 3, and is enlarged to illustrate the component arrangement of the internal-pressure relief means.

Cross bore 26 extended coaxially from relief port 27 and perpendicularly conjunct bore 11 at socket valve 16 and coaxially terminate in gauge port 28 said ports having comparable internal thread 29 for connection to other means as desired, port 28 having plus 30 therein, FIG. 21. On the vertical center line of surface 12 hole 31 is drilled horizontally inward having sufficient diameter and depth for internally threaded outlet port 32, and from said port extending inward coaxially to hole 31 a reduced diameter bore 33 forming seat 34 of check valve 35 that is held inwardly by retaining spring 36 from hole 31 as illustrated by FIGS. 2 and 4.

Figure 5:
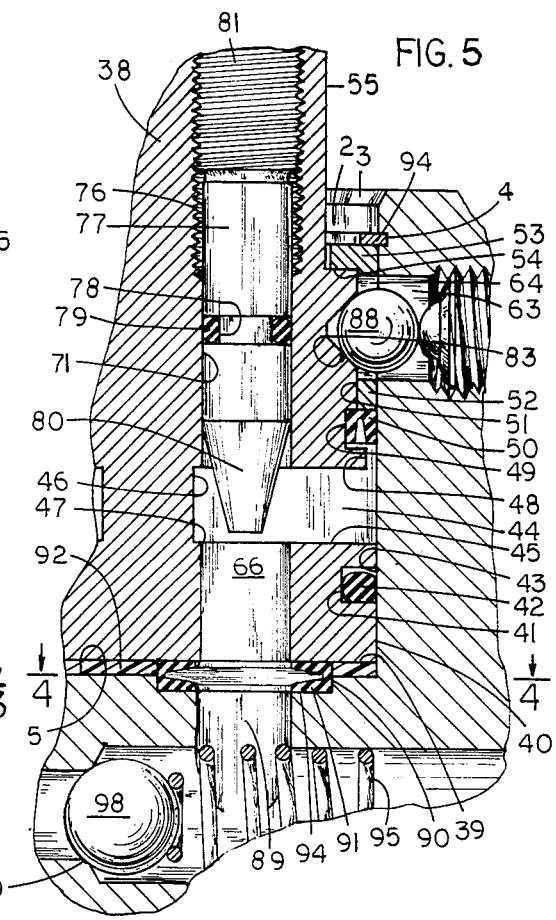
FIG. 5 is an enlarged partial view, same as FIG. 2 illustrates embodiment of orifice opening adjusting means.

The rotatable plug valve sub-assembly as illustrated by FIGS. 2 and 5, as being disclosed and described herein as having a plug valve member 38 with planar surface 39 for inner end, that is perpendicular to longitudinal axis at diameter 40 where groove 41 is circumferentially cut therein having sufficient depth and width to provide adequate contact surface for "O" ring seal 42 to produce pressure tight seal between plug 38 and side wall 43, manifold 44 is circumferentially cut into diameter 40 sufficient in depth to provide a clear surface 45, having adequate margin between stem 46 and seat 47, above said manifold diameter 48 is reduced to provide a clearance between plug 38 and wall 43, said diameter 48 having a groove 49 thereon cut circumferentially having sufficient depth and width to house upper seal 50 and said diameter is further reduced to rotatably and slidably match the inside diameter 51 of sleeve bearing 52 having a lip 53 inwardly toward the center at the top portion to rotatably engage shoulder 54 of plug 38 where said diameter is further reduced to form stem 55 extending outward and ending at top 56 which is having a reduced diameter shank 57 thereon to butt against inner planar surface 58 of knob 59 having screw 60 through the wall 61 of knob 59 to secure said knob to stem 55 at flat 62.

On vertical center line of surface 6 above inlet port 7, bore 63 extending inwardly and is coaxially aligned with diameter opening 64 through sleeve bearing 52, and having internal thread 65 therein, to house detent means.

Plug member 38 having five equal size orifices 66 through 70 inclusive, equally spaced on inner end planar surface 39 extending into manifold 44 into surface 45, coaxially aligned with each said orifice and extending inward from top surface 56 bore 71 through 75 inclusive, having internal thread 76 therein to house orifice opening adjusting means, comprised of cylindrical body 77 having groove 78 circumferentially cut thereon to house seal 79, said body having a cone shaped tip 80 at the inner end protruding into manifold 44 coaxially in line with orifice 66, also having external thread 81 at the upper end, and a slot 82 across said end to facilitate turning in either direction as desired. Said plug 38 also having five tapered nests 83 through 87 inclusive, circumferentially located on diameter 51 and coaxially in line with bore 63, on the radii of each orifice, for detent ball 88.

Figure 20:
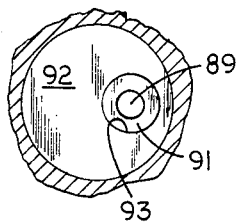
FIG. 20 is a fragmentary, horizontal cross-sectional view taken along line 11—11 of FIG. 11 to illustrate the relationship of the seals to a bore in the bottom of plug bore.

From planar surface 5 eccentrically to vertical center line of bore 2 and coaxially in line with active orifice 66, bore 89 is perpendicularly conjunct inlet port extension bore 8, and having counter bore 90 at surface 5 sufficient in depth and diameter to provide suitable housing for seal 91 protrudingly disposed therein, FIG. 20 said seal is being made of suitable synthetic resin materials and is internally reinforced to maintain required resiliency and share strength.

Figure 6:
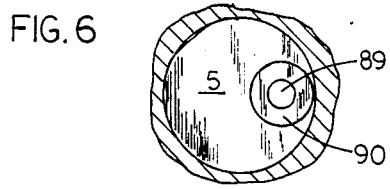
FIG. 6 is a fragmentary, horizontal cross-sectional view to show surfaces of bores, and is taken along line 4—4 of FIG. 5.

Bearing plate 92 being made to a suitable thickness of low friction coefficient synthetic resin materials, having a diameter equal to that of bore 2 and an opening 93 coaxially positioned to engage and to coact with seal 91, FIGS. 5, 6 and 20.

Plug valve sub-assembly 37 rotatably disposed in bore 2, having surface 39 sealably engage bearing plate 92 and seal 91 by the constant force exerted inwardly thereon by a dished spring type retainer ring 94 in groove 4. FIGS. 2 and 5.

The last coil 95 of spring 96 is torsionally wedged in bore 8 and inward end of said spring 96 is forcing ball 98 against 9, and blocking forward passage, and diverting incoming flow from inlet port extension bore 8 into bore 89 through seal 91 into active orifice 66, where flow rate may be further restricted by having cone 80 protruding into active orifice 66, thus reducing the cross-sectional area of said orifice opening to attain precise setting valve FIG. 4, then through manifold 44 into said flow exiting from this positive flow control valve means through outlet port 32, FIG. 2.

Changes in the orifice opening area is accomplished by inserting a flat screw driver into slot 82 and turning adjusting means clockwise causing cone 80 to protrude into orifice 66, and by occupying space therein said cone 80 is reducing the effective cross-sectional area of said orifice opening when turning said adjusting means 77 counterclockwise, said cone 80 then being moved away from seat 47 thus having a smaller portion, or having no portion of said cone protruding into said orifice, thus rate of flow through the valve means decreases or increases accordingly, FIG. 4.

The desired setting value of each orifice adjustment is secured by locking said adjusting means into adjusted position with locking screw 99. Each bore 71 through 75 inclusive having similar adjusting means therein that are interchangeable into each such bores from 71 through 75, FIGS. 2 and 4.

When adjusting means 77 is being turned continually clockwise then cone 80 is moved against seat 47 and effectively blocking the flow from entering manifold 44.

Selecting the desired orifice is accomplished by rotating knob 59 either clockwise or in a counterclockwise direction to align one of five numerals 100 on knob 59 to arrow 101 on tag 102, said five numerals each one of which is in registry with each respective orifice from 66 through 70 inclusive, while detent ball 88 is being held in respective tapered nest 83 through 87, by ball plunger 103 that is being locked in position with set screw 104, to securely maintain the active orifice coaxially aligned with seal 91.

In machine tool applications or the like, where operational sequencing require that return flow unrestrictively be passed through this valve means, then said flow enters through outlet port 32 wherein check valve 35 that is normally closed by spring 36 causing said flow to bypass controlled flow passageway, and through bypass bore 97 enter bore 10, and by dynamically forcing check ball 98 off seat 9, enter extension bore 8, and exiting this valve means through inlet port 7.

The positive flow control valve of this invention as illustrated in FIG. 8 on sheet 2 of 3, as having a plug valve subassembly 105 comprised of knob 106 and plug valve member 107, having external dimensions the same as plug valve member 38 of FIG. 2 and said plug is being interchangeable with similar plug valve members into plug bore 2 of valve body 1, FIG. 2. Plug valve member 107 having six tapered nests from 108 through 113, FIG. 9, on diameter 51 to receive detent ball 88 through bore 64 of sleeve bearing 52 FIGS. 9 and 11 and a plurality of different size orifices 114 through 118 inclusive vertically extending from surface 39 into manifold 44, and having a blind spot 119 between orifice 114 and 118 FIGS. 10 and 14. The position of the six tapered nests 108 through 113 FIG. 9, are correspondingly aligned with the six position in which five orifices 114 through 118 and a blind spot 119 FIG. 10 are illustrated. In FIG. 11 wherein nest 108 is coaxially aligned to detent ball 88, while orifice 114 is coaxially in line with seal 91 atop bore 89. The position of each orifice relative to bore 89 is indicated by numerals from one through six correspondingly arranged on knob 106, in a manner similar to arrangement on knob 59 FIG. 1.

Change in the flow rate through this positive flow control means is attained by rotating plug valve member 107 in either direction to have one of the orifices coaxially aligned to bore 89 through seal 91. When blind spot is aligned to cover seal 91 then detent ball 88 is in tapered nest 113 then the flow path through the controlled flow passageway is being effectively blocked, while having no effect on return flow path from outlet port 32 through inlet port 7, and will not affect the intended functioning of the excess internal pressure relief means through relief port 27.

The maximum pressure within this positive flow control valve assembly 1 of FIG. 1, is determined by the force with which socket valve 16 is held against seat 13, to block the flow path to relief port 27. Having a suitable tool inserted into slot 20 and turningly, adjust self-locking screw 18 inwardly increasing holding force of spring 17 on socket valve 16 against seat 13, this will require higher internal pressure to overcome external force acting upon socket valve 16, when adjusting the screw 18 counterclockwise said screw will relieve spring tension on said valve, thus lowering the maximum limit of the internal pressure therein, FIGS. 13 and 21.

For the interest of simplification and avoiding duplication of any kind, numerals for components and for parts thereof that are not visibly illustrated herein although they do exist within this positive flow control valve means, are omitted herewith.

Figure 7:
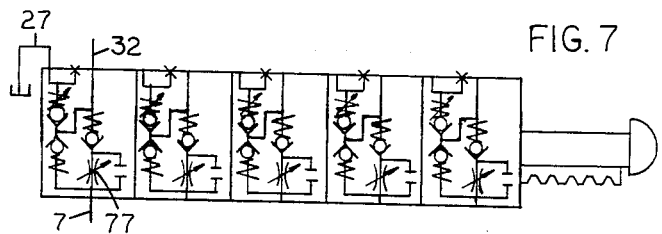
FIG. 7 is a diagrammatic view of the flow path through the valve device of FIG. 2.
Figure 22:
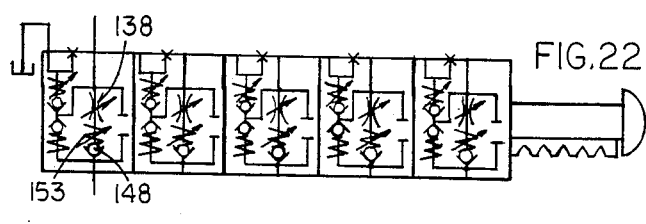
FIG. 22 is a diagrammatic view, similar to FIG. 7 of sheet 1, and FIG. 14 of sheet 2, illustrates the flow path through the valve device, employing individual orifice opening means, that are also utilized as individual check valve.

When the positive flow control valve body 1 of FIG. 1 of this invention is equipped with plug valve subassembly 105 of FIG. 8, 37 of FIG. 2 or 120 of FIG. 15, the functional character of said valve means is altered, as illustrated by the diagrammatical views of FIGS. 7, 14 and 22.

Figure 17:
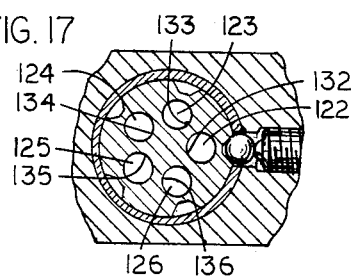
FIG. 17 is a fragmentary, horizontal cross-sectional view taken along line 9—9 of FIG. 15.
Figure 18:
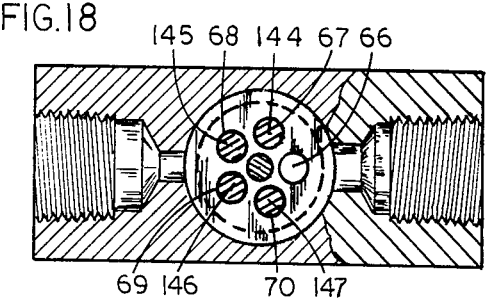
FIG. 18 is a horizontal cross-sectional view taken along line 10—10 of FIG. 15, partially fragmented, similar to FIG. 4 of sheet 1, and FIG. 10 of sheet 2, illustrates the similarity of the inlet port configuration and the difference in horizontal cross-section of orifice opening adjusting said check valve means in position, when there is no flow through the valve from the inlet port to the outlet port or when the flow is directed from the outlet port to the inlet port, ot when the relief port is in use.

Plug valve sub-assembly 120, whereby the plug valve member 121 having all external dimensions and features identically the same as plug valve member of 38 of FIG. 2, and is interchangeably adaptable with plug valve subassembly 105 into plug bore 2 of body 1, FIG. 8. This plug valve member 121 having a plurality of bores 122 through 126 inclusive, from top surface 56 extending inwardly into manifold 44, each having internal thread 127 through 131 therein at the top end FIGS. 16 and 19, while the remainder portion of the wall surface 132 through 136, FIG. 17 is so made to sealably accomodate the sliding action of seal 137 therein FIG. 19. Each bore 122 through 126, having an orifice adjusting means 138 through 142 therein FIG. 16, where each said adjusting means is comprised of a cylindrically shaped piston 143 through 147 FIGS. 18 and 19, having a cone tip 148 coaxially in line with orifice 66 protruding into manifold 44 FIGS. 18 and 19. Into the upper portion of piston 143 circumferentially cut thereon groove 149 with sufficient depth and width to house seal 137, and having a reduced diameter shank 150 at the upper end having a butting surface 151 for top, and a shoulder 152 for spring 153. The adjusting means 138 having a reduced diameter shank 154 with a stopping surface 155 against surface 151 at the lower end, and having a shoulder 156 for the upper end of spring 153, also having a groove 157 longitudinally cut into the outside diameter of 138 and is continued upwardly cutting across external thread 158 thereon into slot 159 at the top end. Within each internally threaded bore 122 through 136, on top of adjusting means 138, having a locking screw 160 with groove 161 identically the same as 157, ending in slot 162 at its top, FIG. 19.

The positive flow control valve means in the present configuration as being illustrated by FIG. 15, pressure being absent from active orifice 66 and piston 143 is at the innermost point of bore 122 and cone 148 is held against seat 47 by the inwardly directed force of spring 153.

Figure 19:
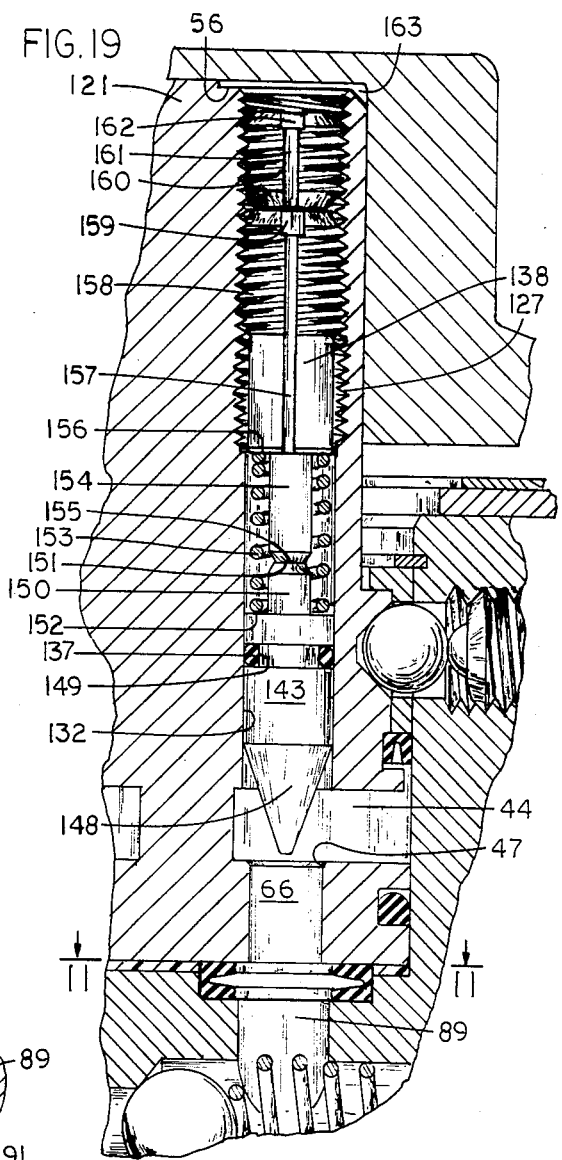
FIG. 19 is a fragmentary, vertical cross-sectional view taken from FIG. 15, similar to FIG. 5 of sheet 1, and FIG. 11 of sheet 2, is enlarged to more clearly illustrate the constructional and the conceptual difference between the orifice opening adjusting means and the individual orifices check valve employed in the invention.

When pressure in active orifice 66 is acting upon cone 148 with force greater than the seating force of spring 153, then piston 143 is slidably displaced upwardly into bore 122 where seal 137 is being forced against side wall 132 and groove 149, preventing any leakage therethrough, and said pressure is causing piston 143 to be further displaced, until surface 151 of shank 150 is butted against shank 154, wherefrom static air is being forced out through groove 157, slot 159, groove 161 of locking screw 160, through top gap 163, and groove 62, into the atmosphere, by the piston 143, FIGS. 15 and 19.

When adjusting means 138 turnably moved inwardly until shank 154 contacts shank 150 at the surface 151, then having cone 148 sealably fixed into seat 47, then flow path through orifice 66 is effectively blocked.

Orifice down sizing when pressure is present in active orifice 66 is accomplished, by having a suitable tool inserted into slot 159 and turnably move adjusting means 138 downward to limit the upward travel of piston 143, and causing cone 148 to protrude into orifice 66, and by occupying space therein, the cross-sectional area of said orifice opening is being reduced.

Orifice opening enlargement is accomplished by turnably moving adjusting means 138 upward to increase gap between shank 150 and shank 154, thus extending the upward travel of piston 143, and by this action having a smaller portion of cone 148 protruding into orifice 66 as in FIG. 4. When adjusting means 138 is at the uppermost portion of bore 122, then cone 148 is out of active orifice 66, FIG. 19.

When spring 153 is interchangeably replaced with one having a predeterminedly higher compression rate per unit of travel, then the upward mobility of piston 143 is impeded within the stroke that is still determined by the adjusted relationship of shank 154 thereto, the increase in compression rating of said spring causing cone 14B to maintain contact with seat 47 until higher pressure is produced in active orifice 66 to overcome the seating force of spring 153, thus opening the flow path to controlled flow passageway, and when said pressure in orifice 66 is lower than the seating force of spring 153 then piston 143 is being forced downward to close opening of orifice 66 by cone 148 being moved into contact with seat 47, FIGS. 19 and 22.

Figure 16:
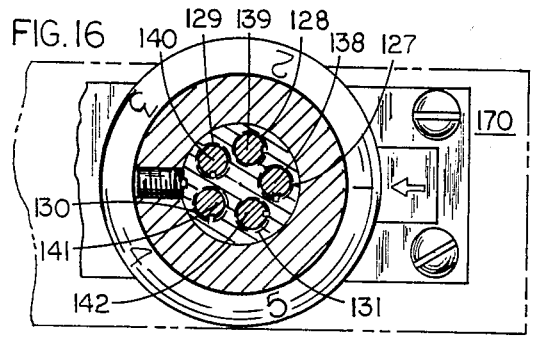
FIG. 16 is a fragmentary, horizontal cross-sectional view taken along line 8—8 of FIG. 15.

These and any other information pertain to any or all orifice opening adjustments that are being stored with the plug valve sub-assemblies 37, of FIG. 2 and 120, of FIG. 15, that are functionally a mechanical memory bank of this positive flow control valve means for said information contained therein, that is readily recalled, and any previously set flow rate is reestablished as well as maintained as desired, by making positional changes of the plug valve sub-assembly 38 and 120 relative to active orifice indicating arrow 101 on tag 102 to any other position marked by numerals 100, from one through five on knob 59, FIGS. 1 and 16.

The body of this positive flow control valve means having threaded bore 164 through 167 vertically extending inward from top surface 168 to facilitate panel mounting, FIGS. 1 and 8, and having screw 169 therein, for mounting said body to panel 170, FIG. 15. When valve body 1 is being mounted onto panel 170 FIG. 16, (said panel is being illustrated by phantom lines only) then plug valve members 37, 107, and 121 are readily replaceable therein as illustrated in FIGS. 1, 8, and 15. In addition to line mounting through inlet port 7 and outlet port 32 threaded bore 171 extending horizontally across said valve body together with two others extending from both side inwardly (not shown) for bracket mounting from either side as desired.

Having thus completely and fully described the invention, what is now claimed as new, and desire to secure by Letters Patent is as follows:

1. A positive flow control valve means for gases and liquids comprising a rectangular housing having an inlet and an outlet port leading inwardly from opposing ends, a central cavity perpendicular to a longitudinal axis and having a cylinderical inner peripheral surface ending in a planar surface from which a vertical bore is off centrally placed to intersect an inwardly leading passageway from said inlet port at a right angle, said cavity being connected through said peripheral surface with a horizontally placed bore radially connected to said outlet port a bypass passageway extending downward and below said cavity and interconnecting a horizontal extension of said inlet port with said outlet port, one way check means in said horizontal extension to divert incoming flow to said cavity, which together with said inlet and said outlet port, is in communication with a relief port having means therein to effectively limit maximum internal pressure, said cavity having a cylinderica plug valve member rotatably secured therein, said plug member having a reduced diameter portion extending outwardly from a shoulder, and a larger diameter portion extending portion inward into bearing means that is rotatably matched thereon from the top and into said cavity, said bearing means forming a part of a housing for a radial sealing means to produce a leak proof seal therebetween and below said sealing means, said diameter of said plug is enlarged, providing a shoulder to secure sealing means therein, and below said shoulder having manifold circumferentially cut thereon to form a controlled flow passageway that is radially connected to said outlet port, at the bottom surface of said manifold, the plug diameter is further enlarged to rotatably match the inside diameter of said cavity, and having a smooth planar surface for the inner end thereof, a groove circumferentially cut into said further enlarged diameter portion for housing another sealing means therein providing a leak proof seal therebetween, said smooth surface of said plug inner end is protectively separated from the planar surface of said cavity by a thrust bearing means therebetween held stationary by a seal therethrough, said seal being mounted in a counter bore located coaxially at the top end of said vertical bore and preventing cross leakage therethrough, said planar plug surface having a plurality radially spaced round orifices therethrough and extending into said manifold whereby each of said orifices can be rotatably moved into coaxial registry with said vertical bore of said cavity, said valve housing having means therein to effectively detent said rotatable plug when a selected position of any one of said orifices is in coaxial registry with said vertical bore.

2. The positive flow control valve as recited in claim 1 further comprising a cone-shaped coil spring torsionally secured in said outlet port and disengageably securing a tapered check valve means into a seat, thus diverting a return flow into said bypass passageway.

3. The positive flow control valve as recited in claim 1 wherein said means for limiting maximum internal pressure includes adjusting means, said adjusting means comprising a threaded bore having a socket type self-locking screw turnably moved inward and outward therein as desired to change the tension of a spiral spring, holding socket value means in seating position and blocking flow into said relief port, until internal pressure therein overcomes said adjusted tension and forcing said socket valve to open said passageway to said relief port.

4. The positive flow control valve as recited in claim 3 further comprising interconnecting passageway through said housing, wherein a passageway from the lower half of said inlet port extending inwardly below said cavity and further extending in reduced diameter to interconnect with the bypass passageway and terminate at the seat of said socket valve means.

5. The positive flow control valve means as recited in claim 1 wherein said thrust bearing plate is made of low friction synthetic resin materials and is disposed in said cavity between said planar surfaces of cavity of plug, and having sufficient resiliency to sealably blocked pressure from entering thereto through standby orifices from said manifold.

6. The positive flow control valve means as recited in claim 1 wherein said sealing means disposed in said counter bore of the vertical passageway slidably engages said planar surface of said plug, providing a leak proof connection thereto for blocking the flow into controled flow passageway, and to provide said leak proof connection between said vertical bore and said active orifice when so selected.

7. The positive flow control valve means as recited in claim 1 wherein said sleeve bearing has an inward lip at the top to slidably engage the shoulder of said plug, and said mechanical retaining means in peripheral surface of said cavity, and having the lower end as part of the housing for said upper sealing means, and having the inside diameter rotatably match the small diameter of said plug, and having the outside diameter slidably match the diameter of said cavity, thereby having filled the difference between the upper end of said plug and the diameter of said cavity, while the diameter of said plug at the lower end is rotatably matched to the said diameter of said cavity, and said groove having said lower sealing means therein providing leak proof seal therebetween, and having pressure present therebetween said seals, acting upon said larger diameter at the inner end and upon seal that is backed by the lower end of said sleeve bearing at the upper end therefore, said pressure therein is forcing said plug valve member inwardly against said protective thrust bearing therebetween said planar surfaces.

8. The positive flow control valve means as recited in claim 1 the rotatable plug valve means has a knob adapted to provide means to rotatably switch to any detented position as well as to identify each said detent position relative to the position of each orifice at said distal end, while indicating which one of the several orifices is activated by being coaxially aligned to receive the flow through said vertical bore.

9. The rotatable plug valve means as claimed in claim 8 wherein said plug valve member has plurality of different size of said orifices, in a radially spaced position and in communication with said manifold at the distal end, and having the place of one said orifice being left blank, to which each said position, a permanently fixed detent location is provided thereon.

10. The positive flow control valve means as claimed in claim 8 wherein said plug valve member comprises means to adjustably calibrate each said orifice opening individually and re-adjustably fix said adjustment therein, by having a threaded bore aligned to each said orifice and each provided therein a plug means having thread meshed with said bore threading at the upper end for coaxial position adjustment, and having a cylinderical body rotatably fitted within said bore, and said body having sealing means thereon to provide a leak proof seal therebetween said body and said bore, and further having a taper at distal end to protrude into said orifice, providing the means for precisely calibrating each orifice opening area, and a separate threaded means is adapted to provide re-adjustable lock thereof for securing said calibration therein.

11. The plug valve member as claimed in claim 10 wherein each said orifice opening adjustments are retained, and means to reestablish any of said calibrated orifice into coaxial alignment to said vertical bore, is provided in combination with said knob that is removably fixed onto said plug and into registry to each said orifice, and said knob having orifice position identifying numerical code thereon in close approximation to a stationary indicating means in registry to said vertical bore.

12. The plug valve member as claimed in claim 10 wherein said orifice calibrating means comprises a plurality of said vertical threaded bores conjuncting the upper surface of said manifold and each is coaxially aligned to said respective orifice, having disposed therein a cylindrival piston and is protruding through said manifold, having tapered inner end sealably seated against the periphery of each respective orifice, having means thereon to provide leak proof seal between said bore and said piston, at the top having said shank providing said shoulder for lower end of said spiral spring, forcing said piston coaxially into said seat, said calibrating means further comprises said threaded adjusting plug having said thread mesh with internal threading of said bore at the top and a cylindrical body rotatably fitted into said bore provided with a longitudinal passagewat thereon to the top, and a shank at the inner end where in combination with said diameter provide a shoulder to which upper end of said spiral spring butting against, and further comprise a threaded locking means having a passageway longitudinally thereon, removably fixed against each said adjusting plug therein.

13. Plug valve member as claimed in claim 10 wherein said orifice opening calibration valves pertaining to each said orifice is readjustably stored therein, and having said knob removably affixed to a predetermined position thereon to indicate the relative position of each said orifice thereto, and to said fixed reference that is bring placed in substantially close approximation thereto, together provide the means for said positive flow control valve to rotatably reestablish any of each said orifice opening setting valve to full use for effectively controlling the rate of any substance being supplied therethrough.

14. Plug valve assembly as claimed in claim 13 define mechanical memory of said flow control valve means.

15. Plug valve assembly as claimed in claim 13 wherein said knob having been removably affixed onto said plug valve member, provide the means to hide from view all orifice calibration means to prevent easy access thereto by persons not familiar with said valve means.

* * * * *